UNITED STATES PATENT OFFICE.

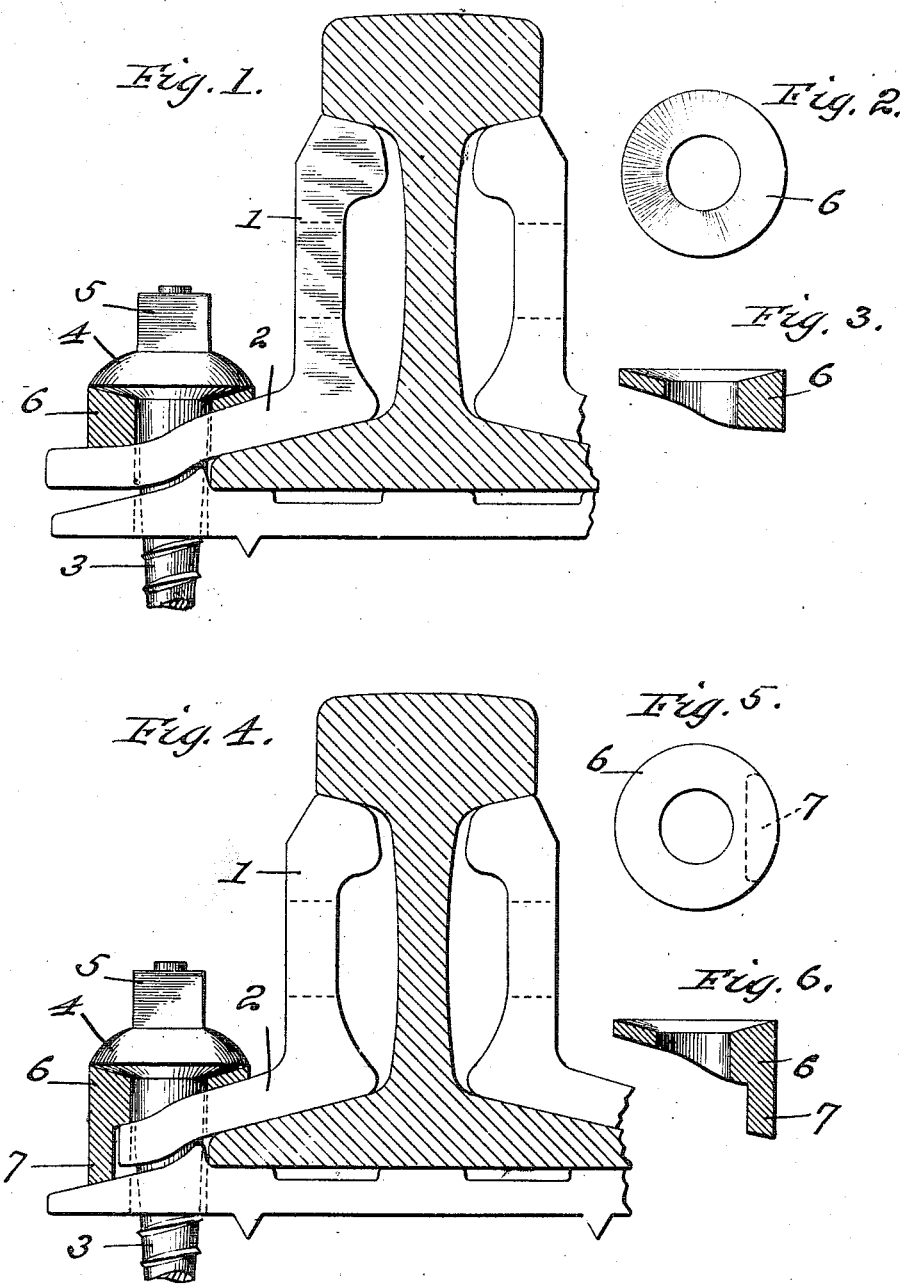

GEORGE L. HALL, OF NEW YORK, N. Y.

RAIL-JOINT.

979,478.  Specification of Letters Patent.  Patented Dec. 27, 1910.

Application filed June 11, 1910. Serial No. 566,352.

*To all whom it may concern:*

Be it known that I, GEORGE L. HALL, a citizen of the United States, and resident of the borough of Manhattan, city, county, and State of New York, have invented certain new and useful Improvements in Rail-Joints, of which the following is a specification.

The main object of this invention is to provide a rail joint having a washer adapted for use on the base flange of the splice-bar, which washer will serve to maintain a screw spike head in its original clamping position, and to hold said head against an outwardly lateral shifting movement.

A further object of the invention is to provide in a rail joint, a washer adapted to contact with the upper surface of the base flange of a splice-bar, the lower surface of said washer being shaped to conform to the upper surface of said base flange, the upper surface of said washer being shaped to conform to the under side of the screw spike head and adapted to hold said head in its true clamping position, preferably horizontal.

Referring to the drawings Figure 1 is a transverse sectional view of a rail showing the rail joint members consisting of the splice-bar, tie plate and screw spike in position thereon, the screw spike washer being also shown in sectional view; Fig. 2 a plan view of the washer; Fig. 3 a vertical sectional view thereof; Fig. 4 a view similar to Fig. 1, showing a slightly modified form of washer; Fig. 5 a plan view of the form of washer shown in Fig. 4; and Fig 6 a vertical sectional view of said washer.

Referring to the various parts by numerals, 1 designates the splice-bar and 2 the base flange thereof. This flange is apertured for the passage of the screw spikes 3, said spikes being formed with heads 4, and wrench-engaging portions 5. The under side of the head is upwardly and outwardly inclined, and interposed between the said head and the upper surface of the splice-bar base flange is a washer 6. The upper outer edge of said washer is in a horizontal plane, while the upper surface inclines downwardly and inwardly to conform to the similarly inclined under surface of the screw spike head. The under surface of the washer is shaped to conform to the upper surface of the splice-bar base flange whereby the outer portion of said washer is much thicker than the inner portion thereof, as shown clearly in Figs. 1 and 3.

It is manifest from Fig. 1 of the drawings that with a washer of this construction the screw spike will be maintained in a vertical position and the head of the spike will be rigidly held against an outward lateral shifting or tilting movement. Without a washer such as I have described it is practically impossible to use a screw spike in connection with a rail joint splice-bar for the reason that the spike heads "kick off" or incline outwardly or laterally with respect to the splice-bar, thereby loosening their hold on the splice-bar flange, and reducing, if not entirely destroying, their clamping action.

In Fig. 4 a washer similar to that shown in Fig. 1 is provided with a depending tie plate engaging lug 7 which projects beyond the edge of the splice-bar flange and rests on the upper surface of the tie plate. Such a washer permits the aperture for the screw spikes to be formed close to the edge of the splice-bar base flange, and consequently said base flange need not be as broad as in the construction shown in Fig. 1. The under surface of the washer is shaped to conform to the upper surface of the base flange of the splice-bar, and the upper surface of said washer is in a horizontal plane.

It is manifest that by the use of a washer such as I have described herein, screw spikes may be used with the ordinary form of rail joint splice-bar, and said spikes will be held in a vertical position, and the heads thereof will be prevented from tilting outwardly or away from the splice-bar. This combination of screw spike and washer and splice-bars forms a very efficient and rigid rail joint.

Having thus fully described my invention, what I claim as new and desire to secure by Letters Patent is:

1. A rail joint comprising a splice-bar formed with a base flange provided with an aperture, a screw spike passing through said aperture and formed with a head, and a washer interposed between said screw spike head and the upper surface of the splice-bar base flange, the upper surface of said washer being shaped to conform to the under side of the screw spike head and adapted to hold said head against an outward lateral shifting movement, the under surface of said washer being shaped to conform to the upper surface of the base flange of the splice-bar.

2. A rail joint comprising a splice-bar formed with a base flange provided with an aperture, a screw spike passing through said aperture and formed with a head, said head being downwardly and inwardly inclined on its under surface, a washer interposed between said head and the upper surface of the splice-bar base flange, the upper surface of said washer being downwardly and inwardly inclined to correspond with the inclination of the under side of the screw spike head, the under surface of said washer being shaped to conform to the downwardly and outwardly inclined upper surface of the said base flange, whereby said washer will be higher on its outer side and will serve to hold the screw spike in a vertical position and to prevent an outward lateral shifting movement of the spike head.

3. A rail joint comprising a splice-bar formed with a base flange provided with an aperture, a screw spike passing through said aperture and formed with a head, said head being downwardly and inwardly inclined on its under surface, a washer interposed between said head and the upper surface of the splice-bar base flange, the upper surface of said washer being downwardly and inwardly inclined to correspond with the inclination of the under side of the screw spike head, the under surface of said washer being shaped to conform to the downwardly and outwardly inclined upper surface of the said base flange, whereby said washer will be higher on its outer side and will serve to hold the screw spike in a vertical position and to prevent an outward lateral shifting movement of the spike head, and a depending tie plate engaging lug formed on the under side of the washer and adapted to engage the upper surface of the tie plate.

In testimony whereof I hereunto affix my signature in the presence of two witnesses this 6th day of June, 1910.

GEORGE L. HALL.

Witnesses:
F. R. MILLER,
A. E. PETTERSON.